Dec. 30, 1952 P. R. McEACHRAN 2,623,737
MATERIAL CONDITIONING APPARATUS
Filed Jan. 9, 1950 2 SHEETS—SHEET 1

INVENTOR.
PAUL R. McEACHRAN,
BY
Knight & Rodgers
ATTORNEYS.

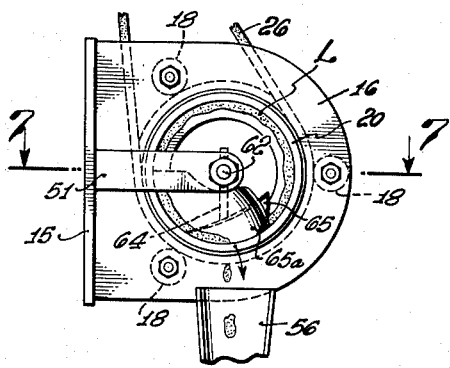
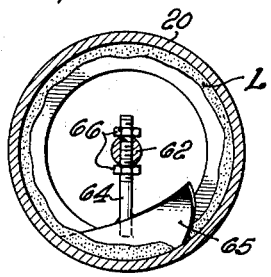
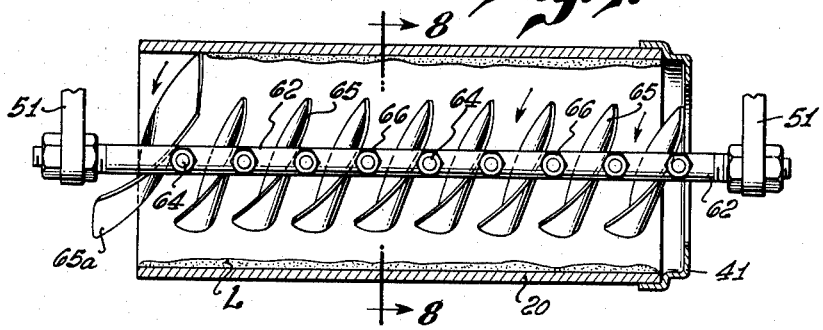
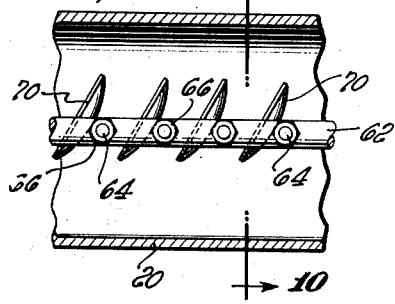
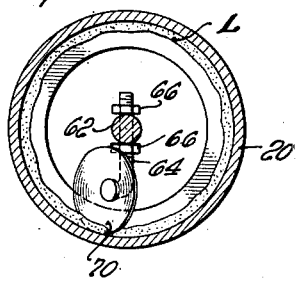
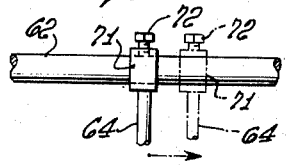

Patented Dec. 30, 1952

2,623,737

UNITED STATES PATENT OFFICE 2,623,737

MATERIAL CONDITIONING APPARATUS

Paul R. McEachran, Los Angeles, Calif., assignor to Olympic Manufacturing Corporation, Los Angeles, Calif., a corporation of California Application January 9, 1950, Serial No. 137,561

1 Claim. (Cl. 259—3)

The present invention relates generally to machinery for handling and conditioning materials and more especially to apparatus for continuously mixing a liquid, such as water or an oil, with one or more dry solids, for example gypsum, sand, or rock aggregate, and the like. It may also be used to mix dry solids or for drying materials. However, in its broader aspect, the present invention is not limited to any particular type of material processed nor to a specific process since the apparatus is purposely designed to handle a wide range of materials and to perform different types of handling and conditioning operations.

At the present time, many operations of this character are done by hand, since only a small amount of the product may be wanted. An example of this is mixing together asphalt and rock aggregate to patch a roadway or to perform a small paving job. Under these circumstances, the size of the job does not justify use of the relatively large mixers which have been developed for handling these materials since the cost of maintaining and operating such equipment is uneconomical for jobs of this character. At the same time, the cost of hand labor has risen to the point where a limited investment in machinery may well be economically sound even on the smallest jobs.

The same general economic considerations apply to certain other types of jobs where the controlling factor may be the relatively low rate of output required because of the low rate at which the product is used. Where this is true, the rate of consumption, even though steady, inclines contractors toward hand operations in mixing and handling materials rather than toward the use of machinery, especially if the material is one which must be used quickly after mixing and cannot be stock piled. An example of this is mixing water with plaster of Paris to form blocks, fill molds, or for other like purposes. A similar situation also prevails in mixing plaster on residential construction jobs where the rate at which the mixed plaster is produced is controlled by the fact that only one or two plasterers are applying the plaster to walls.

These are typical of many more situations wherein two or more substances are mixed together. The development towards mechanical means for performing mixing operations has been in the direction of large machines which are specialized, and being designed for a particular purpose cannot be easily converted or used for other mixing or conditioning operations. Oftentimes, although the machines have some degree of versatility and are not extremely large, they cannot be converted to other operations because they are too hard to clean. This is a result of the configuration of various elements used for agitating and churning the materials during mixing. Another shortcoming found in many types of apparatus is the fact that they are adapted only to batch operations and therefore do not make the most of their potential economy since a substantial portion of the time is used not in mixing the materials but in charging or discharging material from the apparatus.

Hence it becomes a general object of my invention to design apparatus for handling or conditioning materials which is simple in construction and design, is adapted to handle a wide range of materials and to perform a variety of operations, and at the same time is able to perform these operations efficiently.

It is also an object of my invention to provide a device of this character which is especially designed for apparatus of small capacities, but which at the same time may be made in different sizes in order to provide maximum economy and a minimum of investment in the equipment.

It is a further object of my invention to provide conditioning apparatus which is capable of continuous operation and capable of adjustment to secure the best rate of throughput and total mixing time within a substantial range of these conditions.

In general, it is an object of my invention to design a relatively small and inexpensive material conditioning apparatus which is sufficiently versatile and adjustable to provide a builder with an all around tool.

These and other objects of my invention have been attained by providing on a suitable supporting frame a drum that has a smooth interior wall and is rotatably mounted and provided with inlet and outlet means at opposite ends, these inlet and outlet means being preferably spaced along the axis of rotation of the drum. At the drum inlet means, there is located means for continuously feeding liquid and/or solid materials into the drum, while at the drum outlet there is located means for discharging mixed product from the drum. Through either the inlet or outlet end of the drum, or both, there may be inserted a heating element for the purpose of heating materials during their passage through the drum.

The axis about which the drum rotates is generally horizontal, but it is preferable to provide means for adjustably tilting the drum axis slightly with respect to the horizontal. The drum is rotated around this axis by suitable drive means which is capable of turning the drum at such speed that the material within the drum is thrown radially outward by centrifugal force and so forms a layer around the inside of the drum.

A stationary bar extends through the drum in an axial direction to support the scraping means. This scraping means is preferably an edge portion of the bar in contact with, or closely adjacent, the inner wall of the drum to divert material away from the wall as it reaches the scraper bar. Material so diverted falls down into the bottom of the drum and there is thus created a churning action which effectively mixes material in the drum. The bar is inclined to the horizontal in order to give to the falling material a motion having a component in the direction of the drum outlet. By tilting the drum and the bar with it, or the bar alone, the inclination of the bar with respect to the horizontal may be changed so that the rate of axial movement of material through the drum can be regulated. In this way the length of time that the material is in the drum and subject to conditioning action can be adjusted as desired. The quality and duration of the mixing action can also be controlled by adjusting the speed of revolution of the drum, by suitable means.

In modified forms of my invention the scraping means comprises a plurality of separate scraping members carried on the bar which may then be moved away from the drum wall. The scraping elements have edges closely adjacent the drum and surface portions inclined to the drum axis which engage the material layer to mix and move it as described.

How the above objects and advantages of my invention, as well as others not specifically referred to herein, are attained can be more readily understood by reference to the following description and to the annexed drawings, in which:

Fig. 6 is a fragmentary end elevation similar to Fig. 2 of a modified form of material scraping means, certain parts being broken away or omitted when possible, both here and in subsequent figures, to simplify the drawings;

Fig. 7 is a fragmentary horizontal median section on line 7—7 of Fig. 6;

Fig. 8 is a vertical transverse section through the drum on line 8—8 of Fig. 7;

Fig. 9 is a fragmentary horizontal median section through the drum illustrating another modified form of scraping means;

Fig. 10 is a vertical transverse section through the drum as on line 10—10 of Fig. 9; and Fig. 11 is a fragmentary elevation of a modified form of connection to the support bar for the scraping discs.

Figure 1:
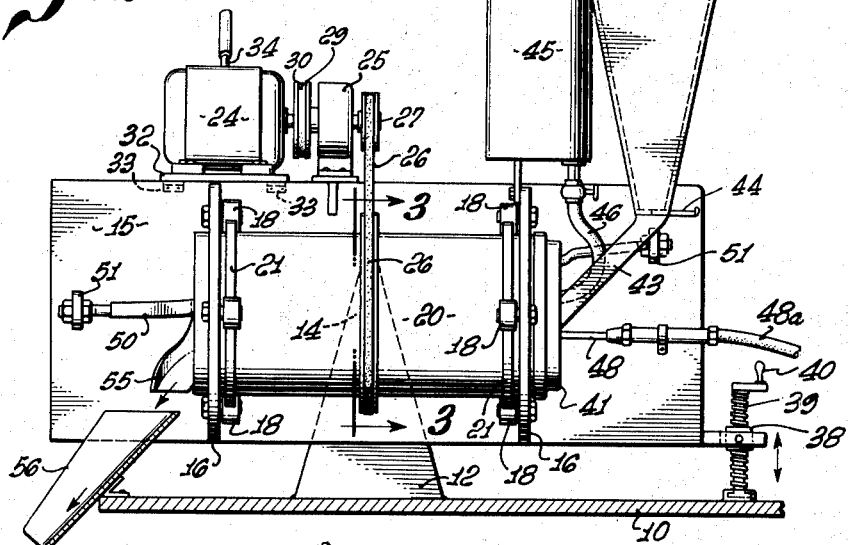
Fig. 1 is a side elevation of material conditioning apparatus constructed according to my invention.

Fig. 1 shows in elevation present preferred form of a complete materials conditioner constructed according to my invention. The apparatus is mounted upon a fixed base 10 which in turn may be mounted upon a wheeled support or the like in order to render the apparatus mobile. At one side of base 10 is pedestal 12 to which the drum support is pivotally connected at 14 for tilting movement about a horizontal axis.

The drum support comprises vertically extending back plate 15 which is engaged by pivot 14. Extending outwardly from back plate 15 are a pair of spaced cradle rings 16 each of which carries three spaced roller bearings 18. All the rollers 18 are arranged with their axes parallel, and each group of three rollers 18 is placed upon one face of a cradle ring 16.

Drum 20 is rotatably supported on the two sets of roller bearings 18 in order to be rotated about its longitudinal axis which is horizontal, or generally so, but which can be tilted as will be explained later. The mixing drum is provided with two spaced bearing rings 21 each of which engages one set of three rollers 18 to provide a bearing on the drum. Drum 20 is longer than the spacing between the two cradle rings 16 and therefore projects outwardly beyond each ring, as shown in Fig. 1. Bearing rings 21 are preferably disposed on opposite sides of cradle rings 16 and are of larger diameter than the openings in rings 16 receiving drum 20, as may be seen in Fig. 4, so that engagement of bearing rings 21 either cradle ring 16 serves to limit axial movement of the drum relative to the stationary cradle rings. The rotational axis of the drum is here shown as intersecting the pivotal axis of plate 15. This is not necessary; but the axes should be at substantially 90° with respect to each other.

Any suitable means for rotating drum 20 may be employed, but I have here shown as typical of such drive means electric motor 24 which may be connected to any convenient source of electric power. In order to obtain maximum flexibility in operation, it is desired that provision be made to drive drum 20 at any selected speed over a pre-established range. This may very conveniently be done by interposing a continuously variable speed reducing unit 25, which may be of any conventional design, between driving motor 24 and the driven drum 20. Drum 20 is driven by V-belt 26 passing around the center of the drum and over the pulley on the end of output shaft 27 of the speed reducer unit. Power is delivered to the speed reducer by another V-belt 29 which passes over pulley 30 on the power input shaft of the speed reducer. In the type of unit here illustrated, pulley 30 is of variable diameter, the diameter being determined by the tension in belt 29.

In order to permit changing the tension in belt 29, motor 24 is mounted on platform 32 which is pivotally connected at one end to back plate 15 by a hinged connection 33. The other end of platform 32 has a sliding connection with lever 34, this connection being held in adjusted position by means of clamping screw 35. If lever 34 is moved downwardly to the left in Fig. 2, motor 24 is moved away from the speed reducing unit, increasing the tension in belt 29 and reducing the diameter of pulley 30. The reverse result occurs when lever 34 is moved upwardly and to the right in Fig. 2. For any desired speed, clamp nut 35 is tightened so that lever 34 supports the outer end of motor plate 32 in a fixed position.

Although the longitudinal axis about which drum 20 rotates may be fixed in a horizontal position, or a nearly horizontal one, it is preferable that the axis be capable of controlled tilting movement. For this purpose, one end of back plate 15 is attached to nut 38 on lead screw 39 which can be rotated manually by handle 40. According to the direction in which lead screw 39 is rotated, nut 38 is raised or lowered on the screw, thus tilting back plate 15 and the axis of the mixing drum since this axis is fixed with respect to the back plate. Under this circumstance, it has been found preferable to mount the drum driving means directly upon the drum support so that the driving means and the drum always occupy the same relative positions with respect to each other regardless of any inclination given to the axis of the drum.

Figure 4:
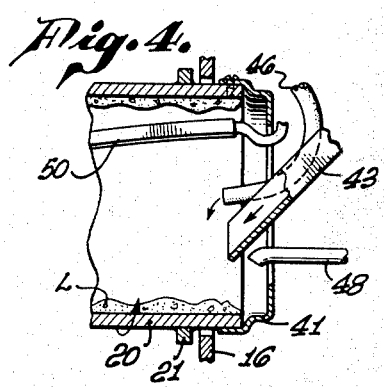
Fig. 4 is a fragmentary vertical longitudinal section at the inlet end of the drum.

Drum 20 is preferably cylindrical in shape as shown, but may be made conical, and open at both ends, the opening at one end providing inlet means and the opening at the other providing outlet means. Although not necessary, it is preferable that the inlet end of the drum be provided with flange 41, as shown in Fig. 4, in order to reduce the size of the inlet opening and provide an annular flange which holds the material in the drum and prevents its spilling out.

At the inlet end of the mixing drum there is located means for continuously introducing into the drum the various materials. Such means may be any one of various conventional types and the construction determined by the kind of materials to be fed. For example, there is indicated at 42 a hopper for feeding by gravity pulverulent or granular materials such as sand, plaster, and the like. Materials are introduced directly from the bottom of hopper 42 into the inlet end of drum 20 by a chute 43 which may have a gate 44 or any other well-known means to regulate the rate of feed. Oil or a fluid mixture may be introduced into drum 20 from tank 45 through hose 46 the lower end of which is located just inside flange 41. Water or other liquids may likewise be introduced by means of nozzle 48 on hose 48a which projects into the inlet of the drum. Hopper 42, tank 45, and nozzle 48 may conveniently be held in proper position to discharge into the drum inlet means by attaching them to back plate 15 by suitable clips, brackets, or other supporting members.

Stationary bar 50 extends through drum 20 for its full length and is fastened at its ends to back plate 15 by means of brackets 51, or any other suitable arrangement. As shown particularly in Fig. 3, bar 50 has at one side a comparatively sharp or thin edge portion which is positioned close to, or in contact with, the inner wall of drum 20 to function as scraping means and to perform a scraping action relative to the drum and divert material away from the drum wall. Any spacing between the edge of the bar and the drum wall may be varied as desired by moving the bar in horizontally elongated holes 51a in brackets 51. The portion of bar 50 away from drum 20 is comparatively heavy and thick to provide a rigid supporting means for the scraping edge. A replaceable scraping edge may be used, if desired, bolted to the supporting bar.

As may be seen from Fig. 1, bar 50 may be characterized as inclined to the horizontal; and thus it is also inclined to the axis of rotation of the drum since this axis is at or close to the horizontal. The inclination of the bar with respect to the horizontal can be varied by rotating lead screw 39 to raise or lower the right hand end of back plate 15 since any rotation of the back plate about its pivotal mounting 14 changes the inclination of bar 50. It will be noticed, however, that this movement of the back plate does not change the inclination of the bar relative to the drum axis since both the drum and the bar are fixed with respect to each other. Because of this relative inclination of the bar and the drum axis, the shape of the bar, at least at the scraping edge, is that of a helix of relatively great pitch since the bar makes only about one-eighth or one-sixth of a revolution for the length of the drum.

Bar 50 is also used as a convenient means for supporting material discharge means at the outlet end of drum 20. This discharge means takes the form of scoop 55 connected at its upper end to the bar with its lower end in a position to discharge material onto stationary chute 56 which may be supported on base plate 10 in any convenient manner.

It will be obvious without further illustration that, as an alternative construction, bar 50 can be straight, or substantially so, in which event it is parallel, or substantially so, to the axis of drum 20. With this construction the axis of the drum would be inclined to the horizontal by the angle desired, or nearly so, for the bar to secure proper flow through the drum. Under most circumstances this angle of inclination would not exceed about 10°.

The operation of my improved material conditioning apparatus will be readily understood from a description of a typical mixing operation. One such is the hydration of plaster of Paris. In this operation the dry powdered plaster of Paris is placed in hopper 42 and fed through chute 43 into the inlet end of the drum. The feed of this dry material is continuous and at a substantially uniform rate. Water is introduced into the inlet end of the drum through nozzle 48, the supply of water also being continuous and at a controlled uniform rate.

Figures 2, 3:
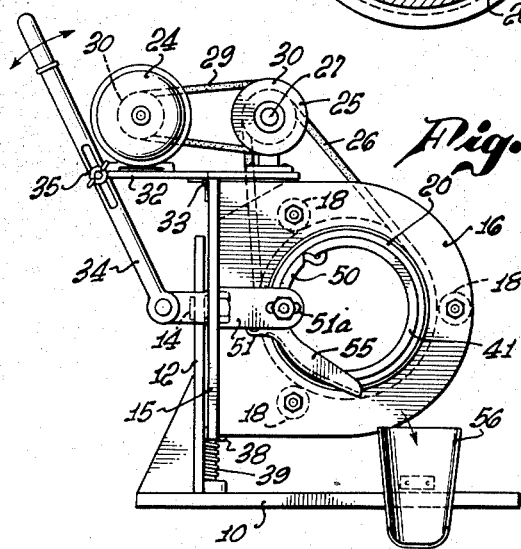
Fig. 2 is an end elevation of the apparatus of Fig. 1 looking toward the left hand end or outlet end of the drum, as viewed in Fig. 1.
Fig. 3 is a fragmentary vertical section through the drum alone on line 3—3 of Fig. 1.

Before introducing the materials to be conditioned, motor 24 is started and drum 20 is driven at its normal speed of rotation. This speed is sufficient that as the materials are introduced into the inlet end, they are thrown outwardly by centrifugal force against the inner face of the drum where they are distributed in a layer L of more or less uniform thickness, as indicated in Fig. 3. As the drum revolves past stationary bar 50, the layer or materials is scraped off the inner wall of the drum, the materials being diverted inwardly away from the drum so that they are free to fall downwardly and are redeposited on the drum at the lower side thereof. This action repeatedly breaks up the layer of materials and creates a churning action which effects a thorough mixing of these materials.

After engagement with bar 50, the material is temporarily free of radially applied or centrifugal forces. It can fall off the bar under the influence of gravity, but the following material in the layer also shoves the particles free of the bar. As a result of the inclination of bar 50 to the horizontal, the motion imparted to the particles of material as they pass over and fall from bar 50, has a component axial of drum 20 in the direction of the drum outlet. As a result, after each engagement with bar 50 the mixed materials are moved a little bit farther toward the outlet end of the drum. By regulating the inclination of bar 50 and the inclination of the drum axis, this rate of movement of the aggregate towards the drum outlet can be regulated to control the rate of flow through the drum. This is one way in which the length of time the material is in the drum can be controlled.

From the above description it will be apparent that the aggregate or other material in the drum can be assumed to move toward the outlet end of the drum by a more or less uniform and definite distance for each revolution of the drum. Consequently, as the drum revolves faster, the material requires less time to travel from the inlet to the outlet end of the drum. As a result, the length of time of conditioning may also be controlled by regulating the speed at which drum 20 is revolved. This is done with the assistance of the variable speed driving unit 25 in the manner previously described.

The time that the material is treated within drum 20 is also subject to variation as a result of other factors. For example, the degree of fluidity of the materials has some influence on the rate of flow through the drum. In the assumed example of hydrating plaster of Paris, if a minimum amount of water is introduced through hose line 48 the resultant mixture is relatively stiff and does not flow as freely under the influence of gravity and other applied forces. If a larger amount of water is added, the mixture is more fluid and eventually reaches a "soupy" consistency. It then moves through the drum faster, other conditions remaining constant.

From the foregoing it will be apparent that other materials such as sand, plaster, crushed rock, and the like may be introduced from hopper 42 into the inlet end of the drum. If the reservoir 45 is filled with some type of oil or asphaltic compound and introduced through hose 46, and added to a crushed rock aggregate supplied from chute 43, then the material discharged from the outlet end of the drum is of a type suitable for paving operations.

Generally speaking, chute 43, hose 46, and nozzle 48 are all adapted to introduce suitable materials into the drum at a uniform and continuous rate. These materials when mixed dry or wet or otherwise conditioned within the drum are then discharged continuously as they are finally scraped off the drum wall and fall onto scoop 55 from which they fall onto fixed chute 56. This capacity for continuous operation makes the most efficient use of the equipment with the lowest operating cost.

Figure 5:
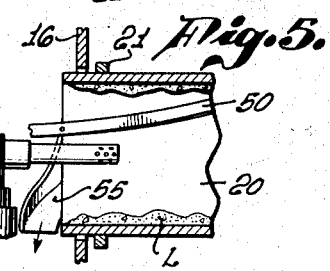
Fig. 5 is a fragmentary vertical longitudinal section at the outlet end of the drum illustrating an alternative construction in which a heating element is inserted in the outlet end to condition materials in the drum by the use of heat.

In addition to being used for mixing and similar operations, the conditioner can also be used as a drier. In Fig. 5, there is illustrated burner 60 which is introduced into the outlet end of the drum and is supplied with some suitable fuel, such as vaporized fuel oil or natural gas, to maintain a flame within the drum. The heat supplied from the flame may be used to dry or otherwise condition materials passing through the drum, the churning action previously described being used primarily to bring about a frequent and thorough exposure of the particles to the heated gases in the drum rather than to effect a mixing of different kinds of particles. Of course, it is entirely possible to mix different materials and heat them or dry them at the same time.

There is shown in Figs. 6, 7, and 8 a variational form of my invention which is the same in all respects as has been previously described except that a different form of scraping or mixing means is employed and the support for the scraping elements has been modified accordingly. As shown particularly in Figs. 7 and 8, the support means is bar 62 which extends axially through the drum. Supporting brackets 51 have preferably been elongated in this form of the invention to place bar 62 at the axis of drum 20. Although this precise position of the support bar is not necessary, it is preferred for reasons which will be developed.

At intervals, bar 62 is provided with parallel holes through which extend rods 64. The outer or lower end of each rod 64 carries a plow-like scraping element 65 which is curved in vertical cross section, see Fig. 7, and preferably has a generally triangular appearance when viewed in elevation, as in Fig. 8. The outer edge of each element 65 is curved to conform to the inner wall of drum 20 and is in contact therewith or spaced only slightly therefrom. A convenient means of adjusting this spacing between each individual scraping element 65 and the inner surface of drum 20 is to thread the end of each rod 64 and provide it with a pair of lock nuts 66 disposed on opposite sides of bar 62. By turning nuts 66, each element 65 may be moved radially toward and away from the drum and locked in adjusted position.

As shown in Fig. 7, plows 65 are generally inclined to support bar 62 and the axis of drum 20 with the result that each plow engages the layer of material L over a portion of the plow surface which can be generally characterized as inclined to the drum axis. The amount of this inclination may be varied by rotating the plow around the vertical axis of rod 64, but ordinarily the scraping elements are designed for a given inclination, depending upon the desired speed of movement of the material toward the drum outlet.

As the drum rotates and carries the annular layer of material with it past the plow-like scraping elements 65, these elements divert the material away from the inner wall of the drum, cutting a furrow in the layer of material in a manner generally similar to the familiar farm plow. This imparts a churning motion to the material that mixes it rapidly and thoroughly. The inclination of the surface engaging the material to the axis of the drum imparts to the material a movement having a component axially of the drum and toward the outlet end. Consequently each time particles of material engage an element 65 they are not only mixed with other particles of material but are generally shifted toward the outlet end of the drum. Eventually they reach the final scraping element 65a which extends out of the outlet end of the drum and scrapes the material out of the drum into discharge chute 56.

In this form of the invention, the scraping means is positioned adjacent the drum wall at or near its lowest point. Gravity is still used to aid material mixing since, as the material rises over the surface of each element 65, it falls back by gravity onto the drum. This particular type of scraping means operates satisfactorily at the bottom of the drum, but the elements 65 may be all moved circumferentially of the drum from the position shown by rotating support bar 62 and brackets 51.

A further modified form of my invention is shown in Figs. 9 and 10 in which the scraping means takes the form of a plurality of concavo-convex discs 70 rotatably mounted upon the lower ends of rods 64. The planes of discs 70 are parallel to one another and inclined to the drum axis, as shown in Fig. 9. The inclination is such that the material strikes the concave side of the discs as the drum rotates, causing the material to be carried up on the disc and then allowed to full back by gravity toward the bottom of the drum. The inclination of the discs facilitates this mixing action and at the same time gives to the particles of material a motion axially of the drum toward the outlet end. Only the lower portion of each disc 70 normally engages the material but that portion of the disc surface which does engage the layer of material L is inclined to the drum axis in the same manner as the surfaces of plows 65 as indicated in Fig. 7.

It will be evident without further detailed description how the mixing action of the scraping elements 70 is similar to that of element 65.

There is illustrated in Fig. 10 a modified form of mounting which may be applied to rods 64. Each rod 64 has at its upper end collar 71 which slides over and along a support bar 62. The collar is provided with set screw 72 which, when tightened, locks the collar in place. By providing each rod 64 with a collar of this character, the scraping elements, whether plows 65 or discs 70, can be individually moved circumferentially of the drum as desired without rotating support bar 62. Also, each individual scraping element can be adjusted axially of the drum so that the interval between successive scraping elements may be adjusted as desired.

From the foregoing description it will be apparent that various modifications and alternations may be made in the structure and arrangement of parts by persons skilled in the art without departing from the spirit and scope of my invention. Consequently, it is to be understood that the foregoing description is considered as illustrative of, rather than restrictive upon, the claim appended hereto.

I claim:
In a material conditioning apparatus, the combination comprising: a base; a plate lying in an upwardly extending plane; pivot means mounting said plate on the base to swing about a substantially horizontal axis; an open ended drum; a pair of spaced cradle members projecting outwardly from one side of the plate; bearing means on the cradle members for mounting the drum to rotate about a substantially horizontal axis at substantially right angles to the axis of the plate pivot; material feed means mounted on the plate to introduce materials to be mixed into one end of the drum; drive means mounted on said plate rotating the drum at a speed sufficient to throw the contained material against the interior surface of the drum by centrifugal force; and a stationary bar extending through the drum and mounted on the plate; the bar being provided with scraping means diverting material away from the interior wall of the drum and creating a mixing action in the material and movement of the material toward the outlet end of the drum.

PAUL R. McEACHRAN.

REFERENCES CITED

The following references are of record in the file of this patent:

UNITED STATES PATENTS

| Number | Name | Date |
|---|---|---|
| 182,329 | Poole | Sept. 19, 1876 |
| 634,416 | McKelvey | Oct. 3, 1899 |
| 888,766 | Stocker | May 26, 1908 |
| 953,961 | Lancaster | Apr. 5, 1910 |
| 1,628,632 | Payne | May 10, 1927 |
| 1,718,004 | Reed | June 18, 1929 |
| 1,993,528 | Roser | Mar. 5, 1935 |
| 2,049,866 | Rapp et al. | Aug. 4, 1936 |
| 2,099,964 | Robbins | Nov. 23, 1937 |
| 2,337,209 | Seeber | Dec. 21, 1943 |

FOREIGN PATENTS

| Number | Country | Date |
|---|---|---|
| 676,815 | Germany | June 12, 1939 |